UNITED STATES PATENT OFFICE.

HENRY W. JOSLIN, OF TRENTON, NEW JERSEY, AND A. K. EATON, OF NEW YORK, ASSIGNORS TO W. REMSEN, ASSIGNOR TO JOSLIN INDIA RUBBER COMPANY, OF NEW YORK, N. Y.

IMPROVEMENT IN THE TREATMENT OF INDIA-RUBBER.

Specification forming part of Letters Patent No. 26,233, dated November 22, 1859.

*To all whom it may concern:*

Be it known that we, HENRY W. JOSLIN, of the city of Trenton, of the county of Mercer and State of New Jersey, and A. K. EATON, of the city of New York, of the county and State of New York, have discovered a new and improved mode of preparing caoutchouc so as to give it the requisite qualities of increased elasticity and freedom from the effects of heat and cold, of which the following is a specification.

The nature of our invention consists in the combination of a native mineral substance known geologically by the name of "argillaceous red shale" of the middle secondary formation, widely distributed in the State of New Jersey and elsewhere, with sulphur, as hereinafter described, and the use of such combination in the treatment or curing of the native caoutchouc or india-rubber. This shale is found in the vicinity of New Brunswick, New Jersey, and by reference to "Rogers' State Geological Report" other localities may be ascertained. The same formation also occurs in other States. This mineral, whether combined chemically with sulphurets of its metallic bases or in its native state, mechanically mixed with the ordinary vulcanizing material, produces a superior quality of goods at a less cost than by any known substance.

The mineral is treated as follows: It is finely ground and bolted, and, if to be used directly with free sulphur, is thoroughly dried before mixture. If otherwise, take fifty pounds of the argillaceous earth in powder, and twenty-six pounds of sulphur. Expose the mixture to a temperature not higher than 700° Fahrenheit for one hour. A portion of the contained bases will be converted into sulphides by this treatment, and the resulting compound will be fitted for the process of vulcanization. We prefer to use about equal parts of this compound and rubber; or, if it should be desirable to use the native mineral in combination with pure sulphur, nine parts of rubber and seven parts of the mineral and one part of sulphur will give a good result. In either case the materials are to be thoroughly worked together in the usual way and the preparation submitted to a gradually-increasing heat, varying from 220° to 310° Fahrenheit, for several hours. The rubber is thoroughly cured by this treatment, and is stronger and more elastic than usual, owing in part that this mineral substance is a poorer conductor of heat than the metallic oxides in common use. Therefore it prevents the heat from so suddenly permeating the rubber as to injure the fabric.

The proportions given must of course be varied according to the kind of article manufactured. A larger proportion of the sulphureted shale in the first compound and of the mineral and sulphur in the second will give a harder gum.

Owing to the peculiar character of this mineral, its presence in vulcanized goods gives them a remarkable softness of surface and fineness of texture. It is composed principally of silica and alumina colored with oxide of iron with traces of lime and magnesia.

Having described the nature of our invention and the methods we have adopted for using the same, we disclaim the mode of curing patented by Charles Goodyear.

What we claim as our invention, and desire to secure by Letters Patent, is—

The treatment of the argillaceous red shale of New Jersey or other similar geological localities in combination with sulphur and caoutchouc, substantially in the manner and for the purpose herein described, for the manufacture of india-rubber fabrics.

HENRY W. JOSLIN.
A. K. EATON.

Witnesses as to signature of A. K. Eaton:
EDM. F. BROWN,
DANIEL BREED.

Witnesses as to signature of Henry W. Joslin:
THOS. P. JOHNSTON,
WM. C. HOWELL.